United States Patent
Scoda (10) Patent No.: US 8,983,935 B2
(45) Date of Patent: Mar. 17, 2015

(54) METHODS FOR UTILIZING A JAVASCRIPT EMULATOR IN A WEB CONTENT PROXY SERVER AND DEVICES THEREOF

(75) Inventor: Enrico Scoda, Martignacco (IT)

(73) Assignee: Usablenet Inc., New York, NY (US)

( * ) Notice: Subject to any disclaimer, the term of this patent is extended or adjusted under 35 U.S.C. 154(b) by 379 days.

(21) Appl. No.: 12/802,670

(22) Filed: Jun. 11, 2010

(65) Prior Publication Data

US 2011/0307238 A1  Dec. 15, 2011

(51) Int. Cl.
*G06F 17/30* (2006.01)
*G06F 7/00* (2006.01)
*G06F 9/455* (2006.01)

(52) U.S. Cl.
CPC .................. *G06F 9/45529* (2013.01)
USPC .......................................... 707/722; 717/138

(58) Field of Classification Search
USPC ....................................................... 717/138
See application file for complete search history.

(56) References Cited

U.S. PATENT DOCUMENTS

| | | | |
|---|---|---|---|
| 6,973,625 B1 * | 12/2005 | Lupo et al. ................ | 715/762 |
| 7,054,952 B1 * | 5/2006 | Schwerdtfeger et al. ..... | 709/246 |
| 7,231,644 B2 * | 6/2007 | Kieffer ...................... | 719/331 |
| 7,480,894 B2 * | 1/2009 | Hasson et al. ............... | 717/115 |
| 7,809,697 B1 * | 10/2010 | Kanefsky et al. ............ | 707/693 |
| 7,966,626 B2 * | 6/2011 | Kieffer ...................... | 719/331 |
| 8,335,982 B1 * | 12/2012 | Colton et al. ................ | 715/234 |
| 8,407,584 B1 * | 3/2013 | Boodman et al. ............ | 715/234 |
| 8,494,832 B2 * | 7/2013 | Krishnan et al. ............. | 703/22 |
| 2007/0288841 A1 | 12/2007 | Rohrabaugh et al. | |
| 2007/0300244 A1 * | 12/2007 | Kieffer ...................... | 719/331 |
| 2009/0006179 A1 * | 1/2009 | Billingsley et al. .......... | 705/10 |
| 2009/0024698 A1 | 1/2009 | Ho et al. | |
| 2010/0223544 A1 * | 9/2010 | Haldimann et al. .......... | 715/234 |
| 2011/0015917 A1 * | 1/2011 | Wang et al. ................. | 703/23 |

FOREIGN PATENT DOCUMENTS

KR  1020100022920 A  3/2010

OTHER PUBLICATIONS

International Search Report for International Patent Application No. PCT/US/2011/040026 (Feb. 9, 2012).

* cited by examiner

*Primary Examiner* — Pavan Mamillapalli
(74) *Attorney, Agent, or Firm* — LeClairRyan, a Professional Corporation (57) ABSTRACT

A method, computer readable medium and apparatus that utilize a JavaScript emulator in a proxy server to create and store an object model of a web page which has one or more JavaScript instruction sets. At least one of the one or more JavaScript instruction sets are extracted from the web page and a JavaScript field identifier is inserted into the web page to optimize the web page which is then provided.

36 Claims, 6 Drawing Sheets

```
function validateLogin() {
    var f = document.LoginForm;
    var error = document.getElementById('error');
    if (f.userId.value == ' ') {
        error.innerHTML = "USER ID cannot be empty";
        return false;
    }
    if (f.password.value == ' ') {
        error.innerHTML = "PASSWORD cannot be empty";
        return false;
    }
    return true;
}
```

METHODS FOR UTILIZING A JAVASCRIPT EMULATOR IN A WEB CONTENT PROXY SERVER AND DEVICES THEREOF

FIELD

This invention generally relates to proxy servers and, more particularly, to methods for utilizing a JavaScript emulator in a web content proxy server and apparatuses thereof.

BACKGROUND

A web content optimization server is a proxy server that optimizes web page interactions for client devices with special requirements, such as mobile phones, PDAs, and smartphones and for browsing tools used by visitors with special needs, such as visual impaired users. By way of example, a web content optimization server optimizes web page interactions as follows. A client device sends an HTTP request for a web page. The web content optimization server downloads the requested original web page from the content server listed in the received request. Next, the web content optimization server optimizes the content of the web page by applying transformation rules tailored to the requesting client device. This optimization process includes extracting the content relevant to the requesting client device and adapting this extracted content to fit the specifications of the requesting client device. By way of example, these transformations include JavaScript removal, content linearization, and small screen adaptation.

Although this process works well to optimize content for display at the requesting client device, the optimization process may fail when the original content heavily depends on JavaScript technology. For example, if the requested web page includes a JavaScript code or instruction set responsible for populating form fields, validating form submissions, retrieving data from external resources (based on AJAX technology), and even generating components that may change the structure of the web page, the page at the client device will not be able to properly function.

Figure 2:
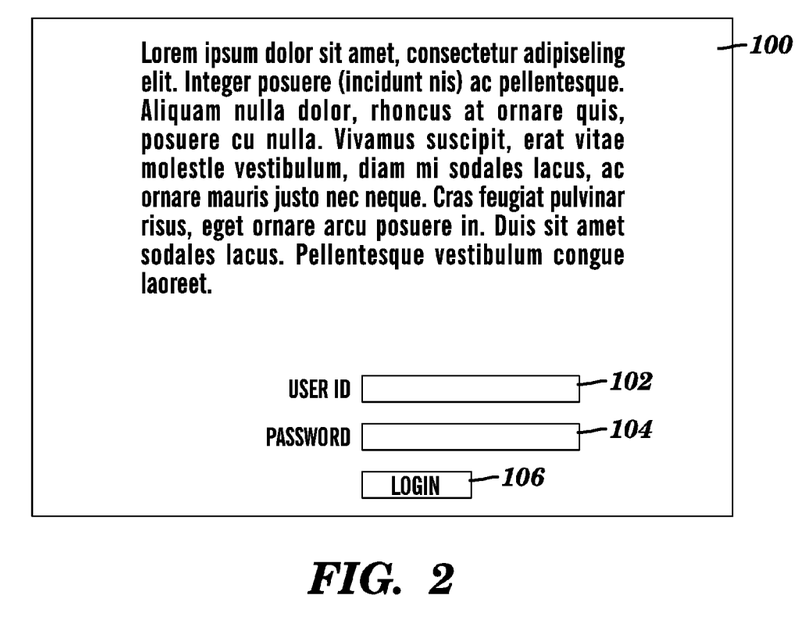
FIG. 2 is a screen shot of an exemplary login form.

One example of how a JavaScript instruction set operates in a web page is illustrated with reference to FIGS. 2-4. Referring more specifically to FIG. 2, an exemplary web page of a login form 100 used to gain access to a web site is illustrated. To execute the login process, a user must enter the correct a user identification into the user id field 102 and a password in the illustrated password field 104 and then click on the login button 106 to submit the login inquiry. The specific action of clicking or otherwise engaging the login button 106 triggers the execution of the JavaScript validateLogin( ) function or instruction set illustrated in FIG. 3. This JavaScript validateLogin( ) function is responsible for validating that the user id field 102 and the password field 104 were properly filled before transmitting to the web content server for the requested web site.

Figure 4:
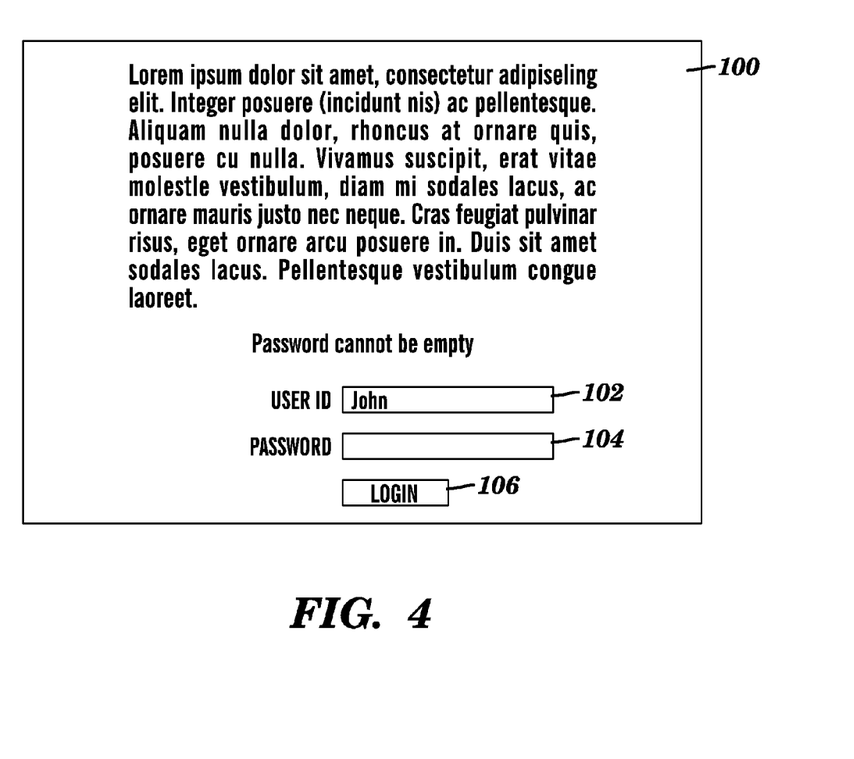
FIG. 4 is screen shot of an exemplary login form with an error message.

Referring to FIG. 4, a scenario where the user entered the value "John" into the user id field 102, but did not enter any value into the password field 104 is illustrated. When the login button 106 is clicked or otherwise engaged, the validateLogin( ) function generates an error and provides the message "Password cannot be empty" to the HTML element of the displayed web page 100 whose attribute id has the value "error". When the validateFunction( ) generates an error the data entered by the user is not sent to the web content server for the requested web site.

If, by way of example, an existing web content optimization server optimizes the content of the web page 100 illustrated in FIGS. 2 and 4 by applying transformation rules to remove the JavaScript programmed instruction set that processes any values entered in user id field 102 and password field 104 and initiates an evaluation of entered values when login button 106 is clicked, any values entered could not be processed. Additionally, any attempt to click or otherwise engage the login button 106 would not provide the desired login functionality. As a result, the web page would have been optimized for viewing on the client device, but with substantially reduced functionality.

SUMMARY

A method for utilizing a JavaScript emulator in a proxy server includes creating and storing with a proxy server an object model of a web page which has one or more JavaScript instruction sets. At least one of the one or more JavaScript instruction sets are extracted from the web page and a JavaScript field identifier is inserted into the web page with the proxy server to optimize the web page which is then provided.

A computer readable medium having stored thereon instructions for utilizing a JavaScript emulator comprising machine executable code which when executed by at least one processor, causes the processor to perform steps including creating and storing an object model of a web page which has one or more JavaScript instruction sets. At least one of the one or more JavaScript instruction sets are extracted from the web page and a JavaScript field identifier is inserted into the web page to optimize the web page which is then provided.

A web proxy apparatus includes one or more processors and a memory coupled to the one or more processors which are configured to execute programmed instructions stored in the memory including creating and storing an object model of a web page which has one or more JavaScript instruction sets. At least one of the one or more JavaScript instruction sets are extracted from the web page and a JavaScript field identifier is inserted into the web page to optimize the web page which is then provided.

A method for utilizing a JavaScript emulator in a proxy server includes loading with the proxy server a stored object model of an original web page which had at least a portion of one or more JavaScript instruction sets previously extracted to form an optimized web page. Any data in a request received at the proxy server which corresponds to the loaded stored object model of the original web page is appended with the proxy server into the loaded stored object model of the original web page. The loaded stored object model of the original web page with any of the appended data is processed and then provided by the proxy server.

A computer readable medium having stored thereon instructions for utilizing a JavaScript emulator comprising machine executable code which when executed by at least one processor, causes the processor to perform steps including loading a stored object model of an original web page which had at least a portion of one or more JavaScript instruction sets previously extracted to form an optimized web page. Any data in a received request which corresponds to the loaded stored object model of the original web page is appended into the loaded stored object model of the original web page. The loaded stored object model of the original web page with any of the appended data is processed and then provided.

A web proxy apparatus includes one or more processors and a memory coupled to the one or more processors which are configured to execute programmed instructions stored in the memory including loading a stored object model of an original web page which had at least a portion of one or more JavaScript instruction sets previously extracted to form an optimized web page. Any data in a received request which corresponds to the loaded stored object model of the original web page is appended into the loaded stored object model of the original web page. The loaded stored object model of the original web page with any of the appended data is processed and then provided.

A method for utilizing a JavaScript emulator in a proxy server includes creating with a proxy server an object model of a web page which has at least one JavaScript instruction set. The at least one JavaScript instruction set from the web page is executed with the proxy server to obtain content. The at least one JavaScript instruction set is removed with the proxy server from the web page and the obtained content is appended to generate an optimized web page with the obtained content which is provided by the proxy server.

A computer readable medium having stored thereon instructions for utilizing a JavaScript emulator comprising machine executable code which when executed by at least one processor, causes the processor to perform steps including creating an object model of a web page which has at least one JavaScript instruction set. The at least one JavaScript instruction set from the web page is executed to obtain content. The at least one JavaScript instruction set is removed from the web page and the obtained content is appended to generate an optimized web page with the obtained content which is provided.

A web proxy apparatus includes one or more processors and a memory coupled to the one or more processors which are configured to execute programmed instructions stored in the memory including creating an object model of a web page which has at least one JavaScript instruction set. The at least one JavaScript instruction set from the web page is executed to obtain content. The at least one JavaScript instruction set is removed from the web page and the obtained content is appended to generate an optimized web page with the obtained content which is provided.

This technology provides a number of advantages including providing a method, computer readable medium and an apparatus that further optimizes a web content proxy server through the utilization of a JavaScript emulator. With the JavaScript emulator, the web content proxy server can continue to apply optimizing transformation rules, while still enabling JavaScript functions in optimized HTTP requests, web pages, interactions with browsers, and other JavaScript events by to be executed with the JavaScript emulator. The JavaScript emulator emulates the behavior of all JavaScript objects that are supported by current web browsers and are used by web developers to access and change the components of web pages.

DETAILED DESCRIPTION

Figure 1:
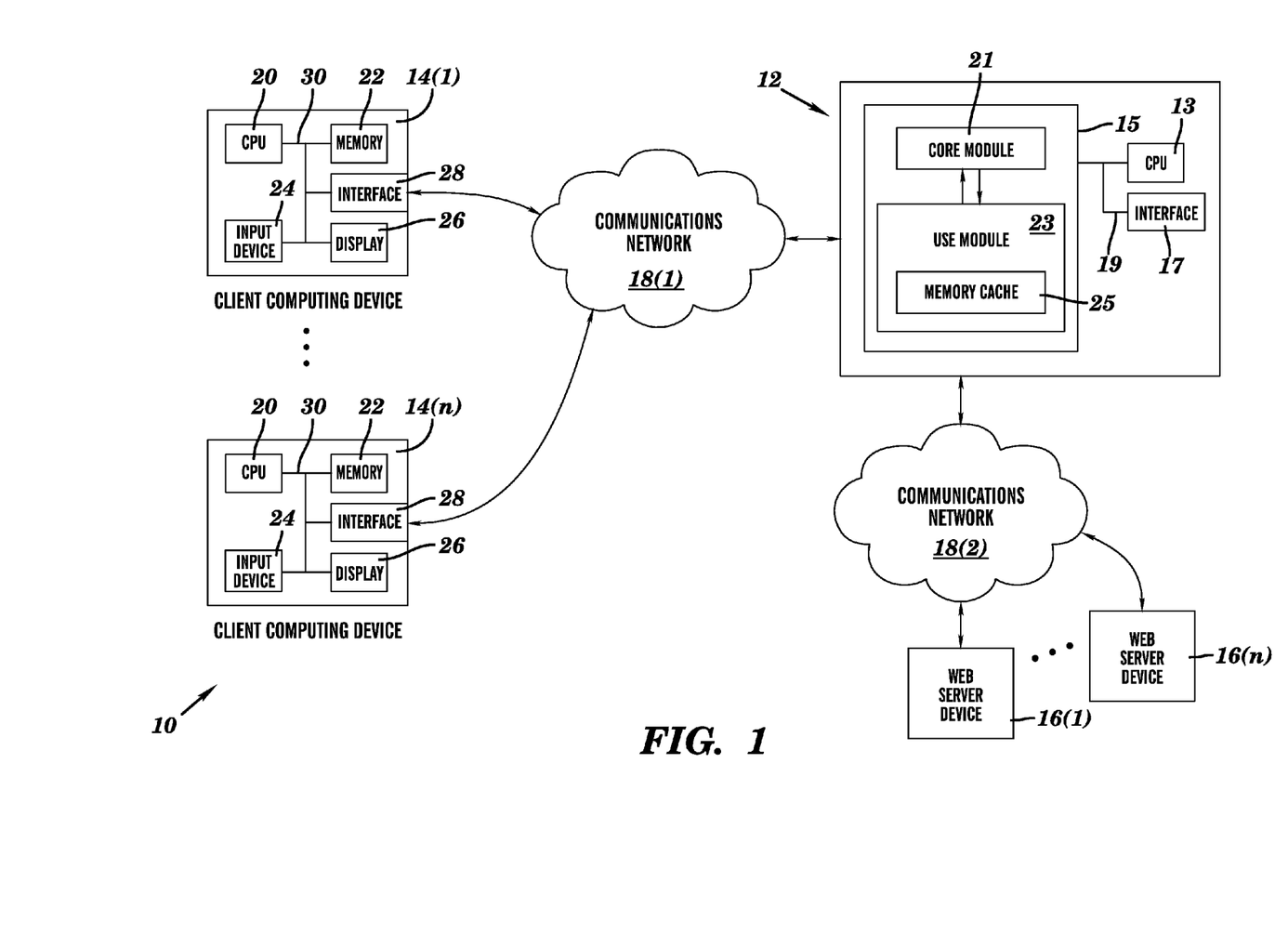
FIG. 1 is a block diagram of an exemplary system environment with an optimized web content proxy server with a JavaScript emulator.

An exemplary environment 10 with a web content proxy server 12 with a JavaScript emulator is illustrated in FIG. 1. The exemplary environment 10 includes the web content proxy server or apparatus 12, client devices 14(1)-14(n), web server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that further optimizes a web content proxy server through the utilization of a JavaScript emulator.

Referring more specifically to FIG. 1, the web content proxy server 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web content proxy server 12 executes a program of stored instructions one or more aspects of the present invention as described and illustrated by way of the embodiments herein, although the processor could execute other numbers and types of programmed instructions.

The memory 15 in the web content proxy server 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the web content proxy server 12. In these embodiments, the memory 15 includes a core module 21 and a JavaScript emulator module 23 with a memory cache 25 which store programmed instructions and other information for one or more aspects of the present invention as described and illustrated herein, although the memory can comprise other types and numbers of systems, devices, and elements in other configurations which store other data. The JavaScript emulator module 23 includes programmed instructions and/or logic configured to as described and illustrated herein including executing JavaScript instructions extracted from optimized web pages or HTTP requests, although the JavaScript emulator module 23 can have other types and numbers of functions as described and illustrated herein.

The interface system 17 in the web content proxy server 12 is used to operatively couple and communicate between the web content proxy server 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, get and interact with web pages from one or more web sites hosted by the web server devices 16(1)-16(n) through the web content proxy server 12 via one or more communication networks, although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In this example, the client devices 14(1)-14(n) comprise mobile devices with Internet access that permit a website form page or other retrieved data to be displayed, although each of the client devices 14(1)-14(n). By way of example only, one or more of the client devices 14(1)-14(n) can comprise smart phones, personal digital assistants, or computers.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n.

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems although other types and numbers of user input devices can be used.

The display 26 in each of the client devices 14(1)-14(n) is used to show data and information to the user, such as website page by way of example only. The display in each of the client devices 14(1)-14(n) is a phone screen display, although other types and numbers of displays could be used depending on the particular type of client device.

The interface system 28 in each of the client devices 14(1)-14(n) is used to operatively couple and communicate between the client devices 14(1)-14(n) and the web content proxy server 12 and web server devices 16(1)-16(n) over the communication networks 18(1) and 18(2), although other types and numbers of communication networks with other types and numbers of connections and configurations can be used.

The web server devices 16(1)-16(n) provide one or more pages from one or more web sites for use by one or more of the client devices 14(1)-14(n) via the web content proxy server 12, although the web server devices 16(1)-16(n) can provide other numbers and types of applications and/or content and can have provide other numbers and types of functions. Although web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations can be used. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n) and the web content proxy server 12 and the client devices 14(1)-14(n) via communication networks 18(1) and 18(2), although other types and numbers of communication networks with other types and numbers of connections and configurations can be used.

Although embodiments of the web content proxy server 12, the client devices 14(1)-14(n), and the web server devices 16(1)-16(n), are described and illustrated herein, each of the client devices 14(1)-14(n), the web content proxy server 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 5:
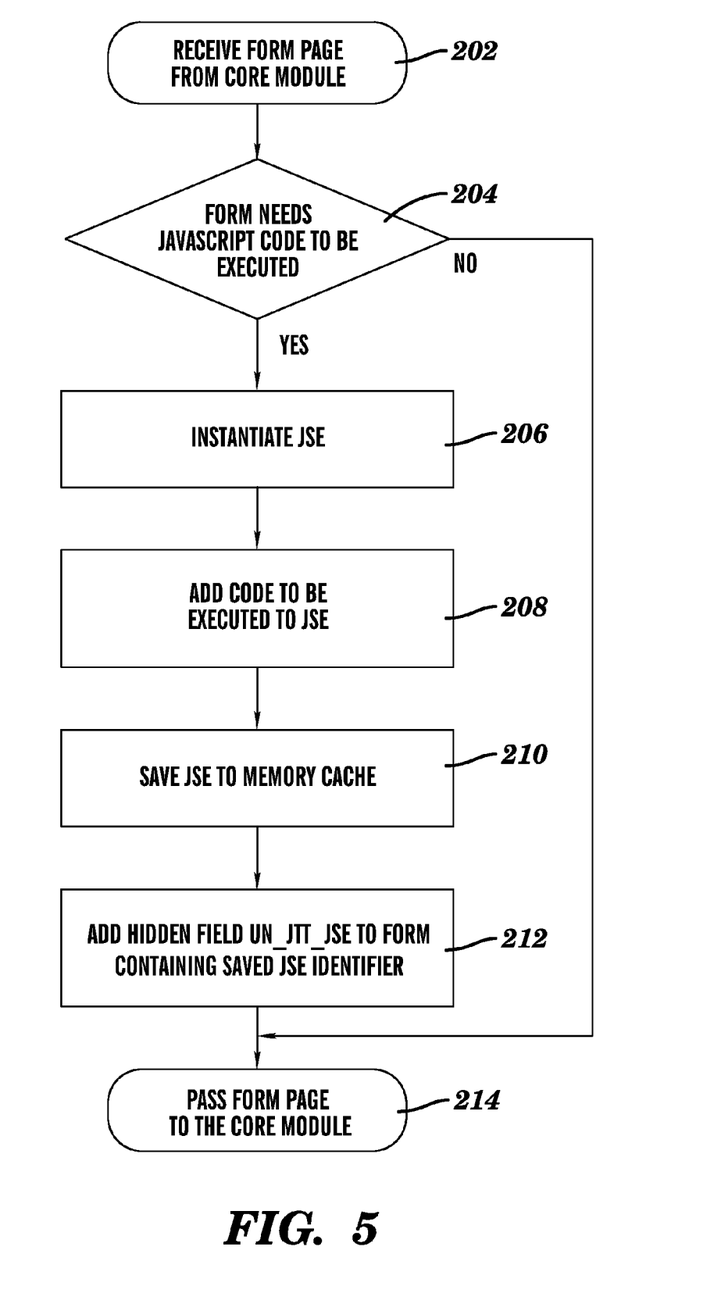
FIG. 5 is a flow chart of an example of a method for instantiating a JavaScript emulator and storing a document object model with an extracted JavaScript instruction set.

An exemplary method for utilizing a JavaScript emulator in a web content proxy server 12 in an exemplary environment 10 will now be described with reference to FIGS. 1-8. Referring more specifically to FIGS. 1 and 5, in this example in step 202, a form web page is received at the web content proxy server 12.

In step 204, the web content proxy server 12 determines whether the received web form page has any JavaScript code or instruction sets for execution during use of the web form page, such as for one or more forms or other fields in the received form web page. If in step 204 the web content proxy server 12 determines the received web form page does not have any JavaScript programmed instruction sets, then the No branch is taken to step 214 described below. If in step 204 the web content proxy server 12 determines the received web form page does has one or more JavaScript programmed instruction sets, then the Yes branch is taken to step 206.

In step 206, the web content proxy server 12 instantiates the received web form page with the JavaScript module 23 which is responsible for emulating the behavior of each of the identified JavaScript instruction sets. During the instantiation, the web content proxy server 12 creates a document object model of the web form page with each of the identified JavaScript instruction sets, although the other types of models could be created.

In this example, for reasons of security and performance four levels of detail can be used when the web content proxy server 12 creates the document object model, although other levels of detail can be used. In this particular example, the levels of detail for the document object model are: basic, attributes, all-but-scripts, and all, although other levels of detail in the document model object can be used. With basic, during the instantiation process when creating the document object model the JavaScript module 23 includes all elements in the web page removing their content, except for the elements of a form, such as checkboxes, radio boxes, combo boxes, buttons, and text fields by way of example. The JavaScript module 23 also includes all attributes of form controls along with only the id and class attributes of all elements. With attributes, during the instantiation process when creating the document object model the JavaScript module 23 includes all elements removing their content, except for the elements of a form, such as checkboxes, radio boxes, combo boxes, buttons, and text fields by way of example. The JavaScript module 23 also includes all attributes of form controls. With all-but-scripts, during the instantiation process when creating the document object model the JavaScript module 23 includes all elements, including both content and attributes, however the JavaScript module 23 removes the content of the elements style and script. With all, during the instantiation process when creating the document object model the JavaScript module 23 includes all elements including both content and attributes.

Once the instantiation process is completed, in step 210 the JavaScript module 23 stores the created document object model for the web page with each of the JavaScript instruction sets in the cache memory 15 and assigns a JavaScript identifier to it, although each of the created document object models could be stored in other manners and in other locations. For security reasons the JavaScript module 23 executed by the web content proxy server 12 also provides the functionality to delete any values in fields before storing the created document object model. Accordingly, the web content proxy server 12 does not store sensitive data, such as credit card numbers, either temporary or permanently.

In step 212, the JavaScript module 23 executed by the web content proxy server 12 adds the assigned JavaScript field identifier for the created document object model in the optimized web form page at each location of an extracted JavaScript instruction set. In this particular example, the JavaScript identifier for the stored document object model is called un_jtt_jse and is stored as a hidden identifier in the optimized web page form provided to the requesting one of the client devices 14(1)-14(n), although other types and numbers of identifiers which are hidden or visible could be used.

In step 214, the JavaScript module 23 passes the optimized web form page to the core module 21 to be provided by the web content proxy server 12 for further use in the exemplary environment 10, such as in a web browser on one of the client devices 14(1)-14(n).

Figure 6:
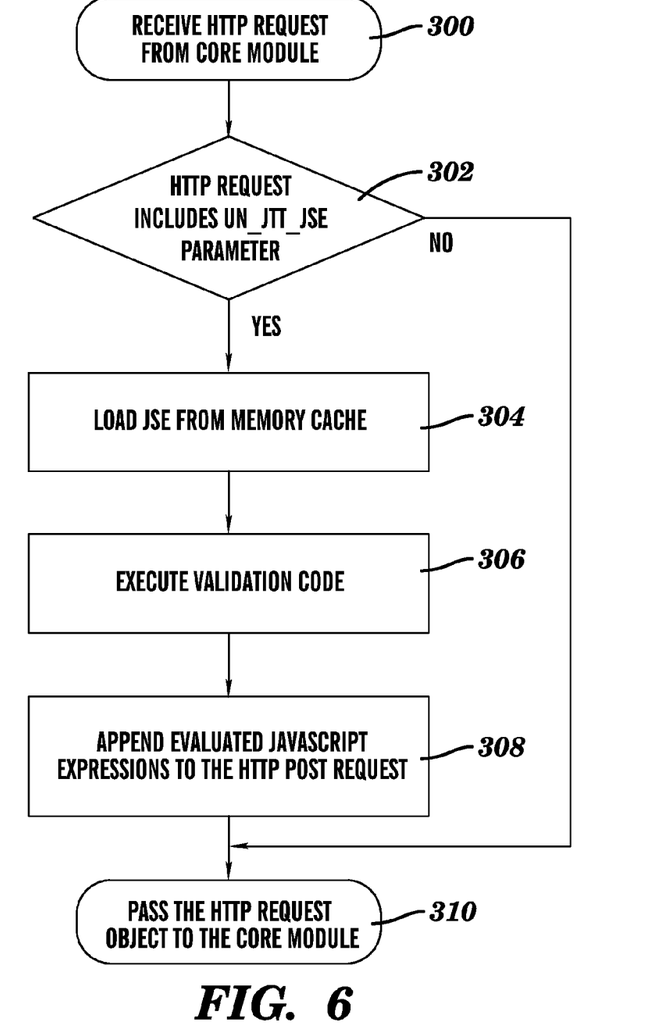
FIG. 6 is a flow chart of an example of a method for processing a received request at the optimized web content proxy server with the JavaScript emulator.

In another illustrative example, an exemplary method for processing a received request at the optimized web content proxy server 12 with the JavaScript emulator is illustrated with reference to FIGS. 1 and 6. In step 300, the JavaScript module 23 in web content proxy server 12 receives an HTTP request from the core module 21 that was received from one of the client devices 14(1)-14(n), although other types of requests, web pages, browser interactions or other types of JavaScript related actions could be received.

In step 302, the JavaScript module 23 in the web content proxy server 12 is executed to determine if the received HTTP request includes one or more hidden JavaScript identifiers or other marker. In this particular example, an un_jtt_jse JavaScript identifier is included in the received HTTP request. If in step 302, the received HTTP request does not include one or more hidden JavaScript identifiers, then the No branch is taken to step 310 as explained below. If in step 302, the received HTTP request does include one or more hidden JavaScript identifiers, then the Yes branch is taken to step 304.

In step 304, the web content proxy server 12 executes the JavaScript module 23 to retrieve from memory cache 25 the corresponding stored document object model for the identified JavaScript identifier. In this particular example, the document object model associated with the JavaScript identifier un_jtt_jse is retrieved.

In step 306, the web content proxy server 12 executes the JavaScript module 23 to validate all of the JavaScript instruction sets in the retrieved document object model.

In step 308, the web content proxy server 12 executes with the JavaScript module 23 each of the JavaScript instruction sets in the document object model with any corresponding values in the received HTTP request. By emulating the typical behavior of a web browser, the JavaScript module 23 executed by the web content proxy server 12 also assigns default values to all those properties whose values can neither be inferred from the received HTTP request nor from the document object module. The web content proxy server 12 appends the output of this execution to the received HTTP request.

In step 310, the JavaScript module 23 is executed by the web content proxy server 12 to pass the core module 21 the response with the executed JavaScript functionality appended to the HTTP request. The core module 21 is executed by the web content proxy server 12 to determine where to provide the response with the executed JavaScript functionality in the exemplary environment 10, such as to a web browser on one of the client devices 14(1)-14(n). For example, the response to the received HTTP request might be an error message if incorrect or insufficient values were provided or might provide other information if all the needed values were provided.

Figure 3:
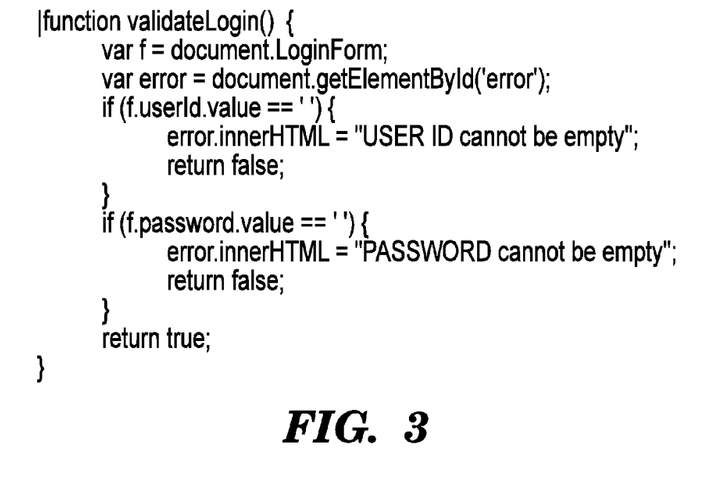
FIG. 3 is an exemplary listing of JavaScript validation source code.

By way of example now, consider the web page form represented in FIG. 2 that can be validated by the JavaScript instruction set or code shown in FIG. 3. The action of clicking on the login button 106 of the optimized form web page 100 triggers a new HTTP request that is sent to the web content proxy server 12 which executes the programmed instructions in the JavaScript module 23. In this example, the received request would includes an un_jtt_jse identifier or parameter so the 61 then the corresponding document object model is loaded from the memory cache 25. The JavaScript module 23 is executed by the web content proxy server 12 to use the form name or its index, i.e. position within the web page or document, to bind the parameters from the received HTTP request with the corresponding controls in the stored document object model representation of the previously extracted JavaScript instruction set during optimization.

At this point, the JavaScript module 23 is executed by the web content proxy server 12 to validate the received HTTP request with the corresponding controls in the stored document object model. Next, the JavaScript module 23 is executed by the web content proxy server 12 to append 64 the output of the validation process to the data included in the received HTTP request. The JavaScript module 23 also is executed by the web content proxy server 12 to retrieve values from JavaScript variables, properties of HTML elements, such as the innerHTML property, input.value or document-.location), or the strings sent to the window.alert( ) and the document.write( ) functions as necessary.

Once the HTTP request has been modified the JavaScript module 23 sends it to the core module 21. Based on the computed data, the core module 21 is executed by the web content proxy server 12 to determine whether to print an error message or send the data from the form to the original web content server.

Figure 7:
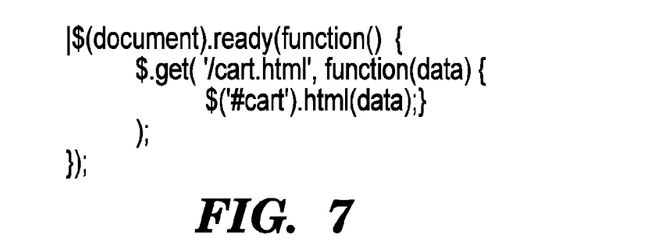
FIG. 7 is an exemplary listing JavaScript with a jQuery request.
Figure 8:
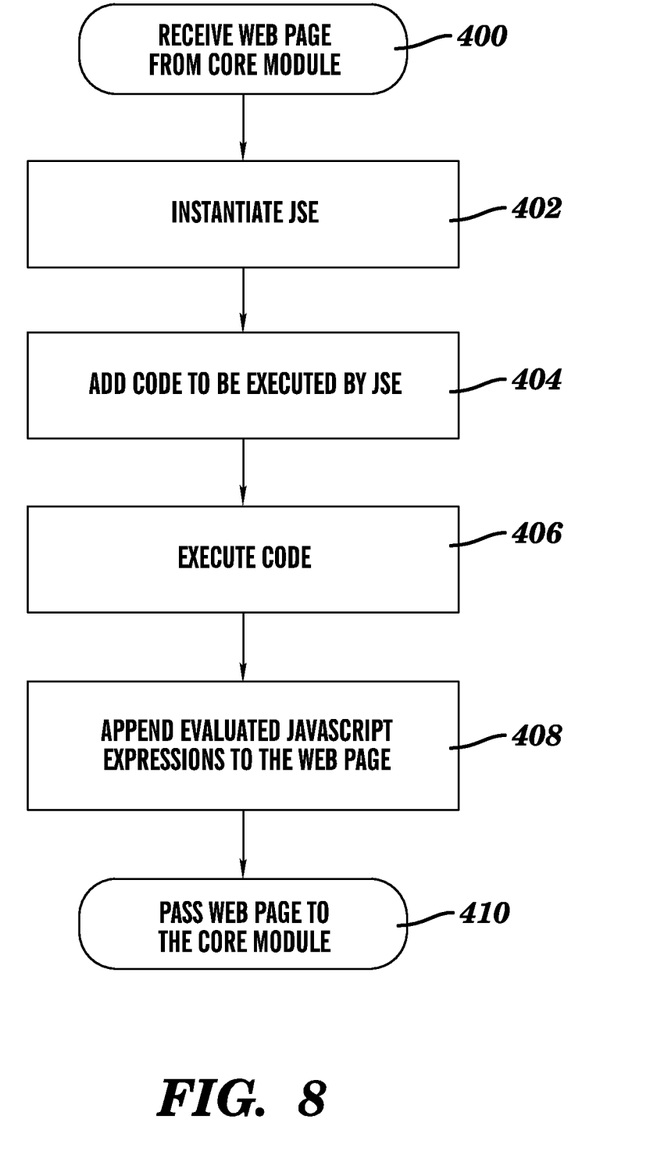
FIG. 8 is a flow chart of an example of a method for processing a received web page with a JavaScript instruction set at the optimized web content proxy server with a JavaScript emulator before extracting the JavaScript instruction set.

In an another illustrative example, an exemplary method a method for processing a received web page at the optimized web content proxy server 12 with a JavaScript emulator for delivery to one of the client computing devices 10 is illustrated with reference to FIGS. 1, 7, and 8. In step 400, the JavaScript module 23 in web content proxy server 12 receives a web page which contains a JavaScript instruction set that creates dynamic content from one of the web server devices 16(1)-16(n), although other types of requests, web pages, browser interactions or other types of JavaScript related actions could be received and the content can be static or dynamic. By way of example, consider a web page with a JavaScript code or instruction set based on the jQuery library shown in FIG. 7. This is a JavaScript framework used to develop complex web applications based on Ajax technology. The event of receiving or loading this web page triggers the execution of the JavaScript code or instruction set shown in the example.

In step 402, the web content proxy server 12 instantiates this received web page which contains the JavaScript instruction set to create a document object model of the web page.

In step 404, the web content proxy server 12 adds the JavaScript programmed instruction set to retrieve dynamic content to the created document object model. In the example illustrated in FIG. 7, the web content proxy server 12 adds the JavaScript module 23 to retrieve the content of '/cart.html' web page and place it into the html element identified by the attribute id with value "cart".

In step 406, the web content proxy server 12 executes the JavaScript programmed instruction set in the document object model of the received web page to obtain the dynamic content. For example, when executing the JavaScript programmed instruction set in the document object model, the JavaScript module 23 can dispatch Ajax calls to retrieve content from external sources, such as one of the web server devices 16(1)-16(n). In this example, the JavaScript programmed instruction set is programmed to retrieve dynamic content, although other types of dynamic or static data from other sources could be obtained.

In step 408, the web content proxy server 12 executes the JavaScript module 23 to append the obtained content in an optimized version of the received web page with the JavaScript programmed instruction set extracted.

In step 410, the JavaScript module 23 is executed by the web content proxy server 12 passes the optimized web page with the extracted JavaScript instruction set and appended dynamic content to the core module 21. The core module 21 is executed by the web content proxy server 12 to determine where to provide the web page with the executed JavaScript functionality in the exemplary environment 10, such as to a web browser on one of the client devices 14(1)-14(n), although other manners for passing the optimized web page with the extracted JavaScript instruction set and appended dynamic content could be used.

Accordingly, as illustrated and described herein this technology provides a number of advantages including providing a method, computer readable medium and an apparatus that further optimizes a web content proxy server through the utilization of a JavaScript emulator. The processes illustrated above are only exemplary and all JavaScript functionality can be emulated by the web content proxy server 12 with this technology. With the JavaScript emulator, the web content proxy server can continue to apply optimizing transformation rules, while still enabling JavaScript functions in optimized HTTP requests, web pages, interactions with browsers, and other JavaScript events by to be executed with the JavaScript emulator. The JavaScript emulator emulates the behavior of all JavaScript objects that are supported by current web browsers and are used by web developers to access and change the components of web pages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for utilizing a JavaScript emulator in a proxy server, the method comprising:
   creating, by a proxy server apparatus, an object model of a web page comprising one or more JavaScript instruction sets;
   storing, by the proxy server apparatus, the created object model;
   extracting, by the proxy server apparatus, at least one of the one or more JavaScript instruction sets directly from the web page and inserting a JavaScript field identifier into the web page at each location of the extracted one or more JavaScript instruction sets to optimize the web page; and
   providing, by the proxy server apparatus, the optimized web page comprising the inserted JavaScript field identifier.

2. The method as set forth in claim 1 wherein the creating the object model of the web page further comprises:
   creating, by the proxy server apparatus, all attributes and content of controls for one or more forms in the web page, wherein all remaining elements of the web page content are removed.

3. The method as set forth in claim 2 wherein the creating the object model of the web page further comprises:
   creating, by the proxy server apparatus, all attributes of identification and class for all the elements of the web page.

4. The method as set forth in claim 2 wherein the creating the object model of the web page further comprises:
   creating, by the proxy server apparatus, all attributes of all the elements in the web page.

5. The method as set forth in claim 1 wherein the creating the object model of the web page further comprises:
   creating, by the proxy server apparatus, all elements of content, wherein all elements of style and script are removed.

6. The method as set forth in claim 1 wherein the extracting further comprises:
   extracting, by the proxy server apparatus, all of the one or more JavaScript instruction sets.

7. The method as set forth in claim 1 further comprising:
   deleting, by the proxy server apparatus, any values in form controls in the created object model.

8. A non-transitory computer readable medium having stored thereon instructions for utilizing a JavaScript emulator comprising machine executable code which when executed by at least one processor, causes the processor to perform steps comprising:
   creating an object model of a web page comprising one or more JavaScript instruction sets;
   storing the created object model;
   extracting at least one of the one or more JavaScript instruction sets directly from the web page and inserting a JavaScript field identifier into the web page at each location of the extracted one or more JavaScript instruction sets to optimize the web page; and
   providing the optimized web page comprising the inserted JavaScript field identifier.

9. The medium as set forth in claim 8 wherein the creating further comprises:
   creating all attributes and content of controls for one or more forms in the web page, wherein all remaining elements of the web page content are removed.

10. The medium as set forth in claim 9 wherein the creating further comprises:
    creating the object model of the web page comprising all attributes of identification and class for all elements of the web page.

11. The medium as set forth in claim 9 wherein the creating the object model of the web page further comprises:
    creating the object model of the web page comprising all attributes of all the elements in the web page.

12. The medium as set forth in claim 8 wherein the creating further comprises:
    creating the object model of the web page comprising all elements and content, wherein all elements of style and script are removed.

13. The medium as set forth in claim 8 wherein the extracting further comprises:
    extracting all of the one or more JavaScript instruction sets.

14. The medium as set forth in claim 8 further comprising:
    deleting any values in form controls in the created object model.

15. A web proxy apparatus comprising:
    one or more processors;
    a memory coupled to the one or more processors which are configured to execute programmed instructions stored in the memory comprising:
      creating an object model of a web page comprising one or more JavaScript instruction sets;
      storing the created object model;
      extracting at least one of the one or more JavaScript instruction sets directly from the web page and inserting a JavaScript field identifier into the web page at each location of the extracted one or more JavaScript instruction sets to optimize the web page; and
      providing the optimized web page comprising the inserted JavaScript field identifier.

16. The apparatus as set forth in claim 15 wherein the one or more processors are further configured to execute programmed instructions stored in the memory for creating the object model of the web page further comprising:
    creating all attributes and content of controls for one or more forms in the web page, wherein all remaining elements of the web page content are removed.

17. The apparatus as set forth in claim 16 wherein the one or more processors are further configured to execute programmed instructions stored in the memory for the creating the object model of the web page further comprising:
    creating all attributes of identification and class for all the elements of the web page.

18. The apparatus as set forth in claim 16 wherein the one or more processors are further configured to execute programmed instructions stored in the memory for the creating the object model of the web page further comprising:
    creating all attributes of all the elements in the web page.

19. The apparatus as set forth in claim 15 wherein the one or more processors are further configured to execute programmed instructions stored in the memory for the creating the object model of the web page further comprising:
    creating all elements and content, wherein all elements of style and script are removed.

20. The apparatus as set forth in claim 15 wherein the one or more processors are further configured to execute programmed instructions stored in the memory for the extracting further comprises extracting all of the one or more JavaScript instruction sets.

21. The apparatus as set forth in claim 15 wherein the one or more processors are further configured to execute programmed instructions stored in the memory further comprising deleting any values in form controls in the created object model.

22. A method for utilizing a JavaScript emulator in a proxy server, the method comprising:
loading, by a proxy server apparatus, a stored object model of an original web page, had at least a portion of one or more JavaScript instruction sets were extracted directly from the original web page to form an optimized web page;
appending, by the proxy server apparatus, any data in a request received by the proxy server which corresponds to the loaded stored object model of the original web page in the loaded stored object model of the original web page, wherein default values are assigned to properties of the stored object model for which values are not available from the appended data in the received request; and
providing, by the proxy server apparatus, the appended stored object model of the original web page.

23. The method as set forth in claim 22 further comprising:
determining, by the proxy server apparatus when the request corresponds to the stored object model of an original web page, wherein the loading and the appending are executed when the request corresponds to the stored object model of an original web page.

24. The method as set forth in claim 22 further comprising:
validating, by the proxy server apparatus, the loaded stored object model of the original web page with any of the appended data.

25. The method as set forth in claim 22 wherein the providing further comprises:
providing, by the proxy server apparatus, one or more functionalities of one or more resulting properties from the loaded stored object model of the original web page comprising any of the appended data to a web-browser on a client computing device.

26. A non-transitory computer readable medium having stored thereon instructions for utilizing a JavaScript emulator comprising machine executable code which when executed by at least one processor, causes the processor to perform steps comprising:
loading a stored object model of an original web page, wherein at least a portion of one or more JavaScript instruction sets were extracted directly from the original web page to form an optimized web page;
appending any data in a request received by a proxy server which corresponds to the loaded stored object model of the original web page in the loaded stored object model of the original web page, wherein default values are assigned to properties of the stored object model for which values are not available from the appended data in the received request; and
providing the appended stored object model of the original web page.

27. The medium as set forth in claim 26 having stored thereon instructions that when executed by the processor cause the processor to perform steps further comprising:
determining when the request corresponds to the stored object model of an original web page, wherein the loading and the appending are executed when the request corresponds to the stored object model of an original web page.

28. The medium as set forth in claim 26 having stored thereon instructions that when executed by the processor cause the processor to perform steps further comprising:
validating the loaded stored object model of the original web page with any of the appended data.

29. The medium as set forth in claim 26 having stored thereon instructions that when executed by the processor cause the processor to perform steps further comprising:
providing one or more functionalities of one or more resulting properties from the processing of the loaded stored object model of the original web page with any of the appended data to a web browser on a client computing device.

30. A web proxy apparatus comprising:
one or more processors;
a memory coupled to the one or more processors which are configured to execute programmed instructions stored in the memory comprising:
loading a stored object model of an original web page, wherein at least a portion of one or more JavaScript instruction sets were extracted directly from the original web page to form an optimized web page;
appending any data in a request received by the a proxy server which corresponds to the loaded stored object model of the original web page in the loaded stored object model of the original web page, wherein default values are assigned to properties of the stored object model for which values are not available from the appended data in the received request; and
providing the appended stored object model of the original web page.

31. The apparatus as set forth in claim 30 wherein the one or more processors are further configured to execute programmed instructions stored in the memory further comprising:
determining when the request corresponds to the stored object model of an original web page, wherein the loading and the appending are executed when the request corresponds to the stored object model of an original web page.

32. The apparatus as set forth in claim 30 wherein the one or more processors are further configured to execute programmed instructions stored in the memory for the processing further comprising validating the loaded stored object model of the original web page with any of the appended data.

33. The apparatus as set forth in claim 30 wherein the one or more processors are further configured to execute programmed instructions stored in the memory for the providing further comprising:
providing one or more functionalities of one or more resulting properties from the processing of the loaded stored object model of the original web page with any of the appended data to a web browser on a client computing device.

34. A method for utilizing a JavaScript emulator in a proxy server, the method comprising:
creating, by a proxy apparatus, an object model of a web page which has at least one JavaScript instruction set;
storing, by the proxy server apparatus, the created object model;
executing, by the proxy server apparatus, the at least one JavaScript instruction set from the web page to obtain content;
removing, by the proxy server apparatus, the at least one JavaScript instruction set directly from the web page and appending the obtained content to generate an optimized web page with the obtained content; and
providing, by the proxy server apparatus, the optimized web page with the obtained content.

35. A non-transitory computer readable medium having stored thereon instructions for utilizing a JavaScript emulator comprising machine executable code which when executed by at least one processor, causes the processor to perform steps comprising:
  creating an object model of a web page comprising at least one JavaScript instruction set;
  storing the created object model;
  executing the at least one JavaScript instruction set from the web page to obtain content;
  removing the at least one JavaScript instruction set directly from the web page and appending the obtained content to generate an optimized web page comprising the obtained content; and
  providing the optimized web page with the obtained content.

36. A web proxy apparatus comprising:
  one or more processors;
  a memory coupled to the one or more processors which are configured to execute programmed instructions stored in the memory comprising:
    creating an object model of a web page comprising at least one JavaScript instruction set;
    storing the created object model;
    executing the at least one JavaScript instruction set from the web page to obtain content;
    removing the at least one JavaScript instruction set directly from the web page and appending the obtained content to generate an optimized web page comprising the obtained content; and
    providing the optimized web page comprising the obtained content.

\* \* \* \* \*